United States Patent
Sao et al.

(10) Patent No.: US 8,936,358 B2
(45) Date of Patent: *Jan. 20, 2015

(54) INK COMPOSITION FOR INK JET TEXTILE PRINTING AND INK JET TEXTILE PRINTING PROCESS

(75) Inventors: Akihito Sao, Matsumoto (JP); Shinichi Itaya, Matsumoto (JP); Shushi Makita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 270 days.

This patent is subject to a terminal disclaimer.

(21) Appl. No.: 13/116,603

(22) Filed: May 26, 2011

(65) Prior Publication Data
US 2011/0292114 A1 Dec. 1, 2011

(30) Foreign Application Priority Data
May 26, 2010 (JP) .................. 2010-120138

(51) Int. Cl.
| | |
|---|---|
| B41J 2/01 | (2006.01) |
| C09D 11/36 | (2014.01) |
| B41J 2/21 | (2006.01) |
| C09D 11/328 | (2014.01) |
| D06P 5/30 | (2006.01) |
| D06P 1/16 | (2006.01) |
| D06P 1/649 | (2006.01) |
| D06P 1/90 | (2006.01) |

(52) U.S. Cl.
CPC .............. C09D 11/36 (2013.01); B41J 2/2107 (2013.01); C09D 11/328 (2013.01); D06P 5/30 (2013.01); D06P 1/16 (2013.01); D06P 1/6495 (2013.01); D06P 2001/906 (2013.01)
USPC ............................................ 347/100; 347/95

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ................... 347/100, 96, 101, 88, 99, 21, 20; 106/31.6, 31.13, 31.27; 523/160, 161
See application file for complete search history.

(56) References Cited

U.S. PATENT DOCUMENTS

| | | | |
|---|---|---|---|
| 3,914,303 A | 10/1975 | Daniher et al. | |
| 4,270,917 A | 6/1981 | Heald et al. | |
| 6,362,348 B1 | 3/2002 | Takahashi et al. | |
| 7,156,909 B2 * | 1/2007 | Oyanagi et al. ............ | 106/31.58 |
| 7,172,648 B2 | 2/2007 | Ichikawa | |
| 7,414,082 B2 | 8/2008 | Hirasa et al. | |
| 7,488,763 B2 | 2/2009 | Ushiku et al. | |
| 7,897,657 B2 | 3/2011 | Nakano et al. | |
| 8,338,645 B2 | 12/2012 | Shiraki et al. | |
| 8,440,745 B2 | 5/2013 | Kotera et al. | |
| 8,557,032 B2 | 10/2013 | Sugita et al. | |
| 2002/0019458 A1 | 2/2002 | Hirasa et al. | |
| 2004/0119801 A1 | 6/2004 | Suzuki et al. | |
| 2006/0092249 A1 * | 5/2006 | Chung et al. ................... | 347/100 |
| 2007/0107146 A1 * | 5/2007 | Egli .............................. | 534/751 |
| 2008/0097013 A1 | 4/2008 | Mizutani | |
| 2009/0047484 A1 | 2/2009 | Kitamura et al. | |
| 2009/0295847 A1 | 12/2009 | Mukai et al. | |
| 2010/0076223 A1 * | 3/2010 | Shiraki et al. ................. | 564/136 |
| 2011/0263898 A1 | 10/2011 | Guglieri et al. | |
| 2011/0292141 A1 | 12/2011 | Sao et al. | |
| 2012/0056929 A1 | 3/2012 | Sao et al. | |
| 2012/0249666 A1 | 10/2012 | Maki et al. | |

FOREIGN PATENT DOCUMENTS

| | | |
|---|---|---|
| EP | 1 867 690 A1 | 12/2007 |
| EP | 1 892 271 A1 | 2/2008 |
| EP | 2 123 631 A1 | 11/2009 |
| GB | 2035384 A | 6/1980 |
| JP | 48-14888 A | 2/1973 |
| JP | 50-094058 A | 7/1975 |
| JP | 50-100386 A | 8/1975 |
| JP | 54-2484 A | 1/1979 |
| JP | 55-54353 A | 4/1980 |

(Continued)

OTHER PUBLICATIONS

Extended European Search Report issued Sep. 30, 2011 in connection with European Application No. 11167243.2.

(Continued)

*Primary Examiner* — Manish S Shah
(74) *Attorney, Agent, or Firm* — Nutter McClennen & Fish LLP; John J. Penny, Jr.; Taylor M. Coon

(57) ABSTRACT

An ink composition for ink jet textile printing at least includes a disperse dye and a solvent represented by the following Formula (1):

$$R^1\text{O}\diagdown\diagdown\diagdown\text{C(=O)N(CH}_3\text{)} \tag{1}$$

(in Formula (1), $R^1$ denotes an alkyl group having 1 to 4 carbon atoms). The solvent represented by the Formula (1) has an HLB value of 10.5 or more and 20.0 or less.

13 Claims, No Drawings

(56) References Cited

FOREIGN PATENT DOCUMENTS

| | | | |
|---|---|---|---|
| JP | 61-213273 A | 9/1986 | |
| JP | H08-127981 A | 5/1996 | |
| JP | H10-158556 A | 6/1998 | |
| JP | 11-335608 A | 12/1999 | |
| JP | 2002-167536 A | 6/2002 | |
| JP | 2003-201428 A | 7/2003 | |
| JP | 2004-197046 A | 7/2004 | |
| JP | 2004-250353 A | 9/2004 | |
| JP | 2004-292468 A | 10/2004 | |
| JP | 2005-015672 A | 1/2005 | |
| JP | 2005-047885 A | 2/2005 | |
| JP | 2006-124855 A | 5/2006 | |
| JP | 2007-146002 A | 6/2007 | |
| JP | 2007146002 A * | 6/2007 | ................. B41J 2/01 |
| JP | 2007-177160 A | 7/2007 | |
| JP | 2007-256485 A | 10/2007 | |
| JP | 2007-291257 A | 11/2007 | |
| JP | 2008-013714 A | 1/2008 | |
| JP | 2008-163238 A | 7/2008 | |
| JP | 2008-238031 A | 10/2008 | |
| JP | 2008-260944 A | 10/2008 | |
| JP | 2008-274034 A | 11/2008 | |
| JP | 2009-074034 A | 4/2009 | |
| JP | 2009-191221 A | 8/2009 | |
| JP | 2009-227813 A | 10/2009 | |
| JP | 2009-242649 A | 10/2009 | |
| JP | 2010180332 A * | 8/2010 | ................. B41J 2/01 |
| JP | 2012-046671 A | 3/2012 | |
| WO | 02/055619 A1 | 7/2002 | |
| WO | 2004/035690 A1 | 4/2004 | |
| WO | 2006/075373 A1 | 7/2006 | |
| WO | 2009/133181 A1 | 11/2009 | |

OTHER PUBLICATIONS

Soeda, et al., "Development of ink by solubilization of disperse dye", Bulletin of Tokyo Metropolitan Industrial Technology Research Institute, 2006, No. 1, pp. 74-75.

[No Author Listed] Database CA [Online] Chemical Abstracts Service, Columbus, OH, Hazama, Database Accession No. 2010:1035182, 2 pages.

[No Author Listed] Database CA [Online] Chemical Abstracts Service, Columbus, OH, Yoshio, Database Accession No. 2007:1096682, 4 pages.

[No Author Listed] Database WPI, Week 197716, Thomson Scientific, AN 1977-27746Y, 1 page.

[No Author Listed] Database WPI, Week 201059, Thomson Scientific, AN 2010-K58621, 2 pages.

Extended European Search Report issued Aug. 1, 2011 in connection with European Application No. 11167244.0 (9 Pages).

* cited by examiner

INK COMPOSITION FOR INK JET TEXTILE PRINTING AND INK JET TEXTILE PRINTING PROCESS

BACKGROUND

1. Technical Field

The present invention relates to an ink composition for ink jet textile printing and an ink jet textile printing process.

2. Related Art

Disperse dyes are used for dyeing hydrophobic synthetic fibers such as polyester, nylon, and acetate. The disperse dyes do not have hydrophilic groups such as sulfonate groups and carboxyl groups and are therefore water-insoluble or low water-soluble. Accordingly, the disperse dyes are used in fine particle forms by being dispersed in aqueous media.

Technologies for dispersing fine particles of disperse dyes in aqueous media have been well known. Examples of a typical dipersant for dispersing a disperse dye in an aqueous medium include formalin condensates of naphthalenesulfonic acid and ligninsulfonic acids, and also include surfactants described in JP-A-48-14888, JP-A-50-100386, JP-A-54-2484, JP-A-55-54353, and JP-A-61-213273.

However, the use of fine particles of dye in a dispersed state has problems in that high temperature is necessary for sufficiently diffusing the fine particles of dye in synthetic fibers, such as polyester or nylon, as an object to be dyed and in that irregular color of the dyed matter is caused by sedimentation of the fine particles of dye. In addition, in an ink for ink jet textile printing, it is necessary to adjust the type and the amount of the dispersant to obtain a low viscosity. Therefore, sufficient stability cannot be realized to cause a decrease in storage stability in some cases. In order to solve these problems, it has been tried to solubilize a disperse dye in a solvent such as methylnaphthalene or n-butyl benzoate, instead of dispersing fine particles of disperse dye in an aqueous medium (for example, see Soeda, et al., "Development of ink by solubilization of disperse dye", Bulletin of Tokyo Metropolitan Industrial Technology Research Institute, 2006, No. 1, pp. 74-75).

However, even if a disperse dye is solubilized in methylnaphthalene or n-butyl benzoate, it is necessary to further add a predetermined surfactant to the solvent in order to maintain the stable solubilization of the disperse dye in the solvent. As described above, in an ink jet textile printing ink containing a disperse dye, there has not been a solvent having, in a well-balanced manner, both lipophilicity for stably solubilizing disperse dyes and hydrophilicity necessary for a dyeing process by steaming.

SUMMARY

An advantage of some aspects of the invention is to solve these problems, to provide an ink composition for ink jet textile printing stably solubilizing a disperse dye therein to achieve a favorable printing effect by steaming, and to provide an ink jet textile printing process using the ink composition.

An advantage of some aspects of the invention is to solve at least a part of the problems described above, and the invention can be realized as the following aspects or application examples.

APPLICATION EXAMPLE 1

An ink composition for ink jet textile printing according to an aspect of the invention at least includes a disperse dye and a solvent represented by the following Formula (1):

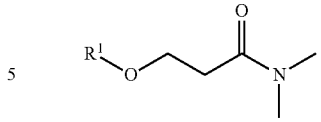

(in Formula (1), $R^1$ denotes an alkyl group having 1 to 4 carbon atoms). The solvent represented by the Formula (1) has an HLB value of 10.5 or more and 20.0 or less.

According to the ink composition for ink jet textile printing of Application Example 1, the disperse dye can be stably solubilized. Furthermore, it is possible to perform dyeing by steaming at a lower temperature than the case of using fine particles of dye in a dispersed state, and also the ink composition is excellent in the storage stability of ink.

APPLICATION EXAMPLE 2

In the ink composition for ink jet textile printing according to Application Example 1, $R^1$ of the Formula (1) representing the solvent can be a methyl group or an n-butyl group.

APPLICATION EXAMPLE 3

In the ink composition for ink jet textile printing according to Application Example 1 or 2, the content of the solvent represented by the Formula (1) can be 30 mass % or more and 90 mass % or less.

APPLICATION EXAMPLE 4

In the ink composition for ink jet textile printing according to any one of Application Examples 1 to 3, the disperse dye can be at least one selected from the group consisting of C.I. Disperse Yellow 114, C.I. Disperse Yellow 163, C.I. Disperse Orange 73, C.I. Disperse Red 15, C.I. Disperse Red 91, C.I. Disperse Red 92, C.I. Disperse Blue 60, and C.I. Disperse Blue 165.

APPLICATION EXAMPLE 5

In the ink composition for ink jet textile printing according to any one of Application Examples 1 to 4, the content of the disperse dye can be 0.1 mass % or more and 10 mass % or less.

APPLICATION EXAMPLE 6

In the ink composition for ink jet textile printing according to any one of Application Examples 1 to 5, the viscosity at a measurement temperature of 20° C. can be 2 mPa·s or more and 15 mPa·s or less.

APPLICATION EXAMPLE 7

In the ink composition for ink jet textile printing according to any one of Application Examples 1 to 6, the surface tension at a measurement temperature of 20° C. can be 20 mN/m or more and 50 mN/m or less.

APPLICATION EXAMPLE 8

An ink jet textile printing process according to an aspect of the invention includes the step of discharging an ink composition for ink jet textile printing according to any one of Application Examples 1 to 7 from an ink jet recording head to let the ink composition adhere to fabric.

According to the ink jet textile printing process of Application Example 8, the process uses the ink composition for ink jet textile printing containing a stably solubilized disperse dye. Therefore, irregular color does not occur in the dyed matter. In addition, it is not necessary to perform steaming at high temperature for sufficiently diffusing the disperse dye in synthetic fibers, such as polyester, nylon, or acetate, as an object to be dyed, and the dyeing can be performed by steaming at lower temperature.

DESCRIPTION OF EXEMPLARY EMBODIMENTS

Preferred embodiments of some aspects of the invention will be described below. The embodiments described below are merely examples of the invention. The invention is not limited to the following embodiments and includes various modifications implemented within the scope of the invention.

1. Ink Composition for Ink Jet Textile Printing

An ink composition for ink jet textile printing according to an embodiment of an aspect of the invention includes at least a disperse dye and a solvent for solubilizing the disperse dye.

Each component used in the embodiment will be described in detail below.

1.1. Disperse Dye

The ink composition for ink jet textile printing according to the embodiment includes at least a disperse dye. The disperse dye is a dye that is used for dyeing hydrophobic synthetic fibers such as polyester, nylon, and acetate and is water-insoluble or low water-soluble.

The disperse dye used in the embodiment is not particularly limited, but specific examples thereof include those shown below.

When the ink composition for ink jet textile printing according to the embodiment is a yellow ink, examples of the disperse dye that can be used include C.I. Disperse Yellow 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 202, 204, 210, 211, 215, 216, 218, 224, 227, 231, and 232.

When the ink composition for ink jet textile printing according to the embodiment is an orange ink, examples of the disperse dye that can be used include C.I. Disperse Orange 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 66, 71, 73, 76, 78, 80, 89, 90, 91, 93, 96, 97, 119, 127, 130, 139, and 142.

When the ink composition for ink jet textile printing according to the embodiment is a red ink, examples of the disperse dye that can be used include C.I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 298, 302, 303, 310, 311, 312, 320, 324, and 328.

When the ink composition for ink jet textile printing according to the embodiment is a violet ink, examples of the disperse dye that can be used include C.I. Disperse Violet 1, 4, 8, 23, 26, 27, 28, 31, 33, 35, 36, 38, 40, 43, 46, 48, 50, 51, 52, 56, 57, 59, 61, 63, 69, and 77.

When the ink composition for ink jet textile printing according to the embodiment is a green ink, examples of the disperse dye that can be used include C.I. Disperse Green 9.

When the ink composition for ink jet textile printing according to the embodiment is a brown ink, examples of the disperse dye that can be used include C.I. Disperse Brown 1, 2, 4, 9, 13, and 19.

When the ink composition for ink jet textile printing according to the embodiment is a blue ink, examples of the disperse dye that can be used include C.I. Disperse Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, and 333.

When the ink composition for ink jet textile printing according to the embodiment is a black ink, examples of the disperse dye that can be used include C.I. Disperse Black 1, 3, 10, and 24.

The disperse dyes exemplified above may be used alone for a primary color or in a combination of two or more thereof for a mixed color.

The content of the disperse dye in the ink composition for ink jet textile printing according to the embodiment is preferably 0.1 mass % or more and 10 mass % or less, more preferably 0.25 mass % or more and 8 mass % or less, and most preferably 1 mass % or more and 5 mass % or less, from the viewpoints of dyeing property of the ink and solubility of the disperse dye.

1.2. Solvent

The ink composition for ink jet textile printing according to the embodiment includes at least a solvent represented by the following Formula (1):

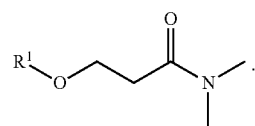
(1)

It has been revealed by intensive studies that an alkyl group having 1 to 4 carbon atoms is preferred as $R^1$ in the Formula (1). The term "alkyl group having 1 to 4 carbon atoms" refers to a linear or branched alkyl group, and examples thereof include a methyl group, an ethyl group, an n-propyl group, an iso-propyl group, an n-butyl group, an iso-butyl group, a sec-butyl group, and a tert-butyl group. A solvent represented by the Formula (1) in which $R^1$ is an alkyl group having 1 to 4 carbon atoms is excellent in disperse dye-solubilizing ability and can stably solubilize disperse dyes. In addition, the solvent is significantly excellent in solubility in water. Therefore, the solvent can be easily removed by washing with water after dyeing an object to be dyed.

The solvent represented by the Formula (1) has an HLB value of 10.5 or more and 20.0 or less, preferably 12.0 or more and 18.5 or less. A solvent represented by the Formula (1) having an HLB value within this range has high ability of dissolving disperse dyes and satisfactory solubility in water and is therefore preferred. Note that the HLB value in this specification is a value calculated using the following Expression (2) from a ratio of an inorganic value (I) to an organic value (O) (hereinafter also simply referred to as "I/O value") based on an organic conception diagram:

$$\text{HLB value} = (\text{inorganic value}(I)/\text{organic value}(O)) \times 10 \qquad (2).$$

Specifically, the I/O value can be calculated based on the literature: Atsushi Fujita, "Systematic Organic Qualitative Analysis (Keitoteki Yuki Teisei Bunseki) (Mixture Edition)", Kazamashobo Co., Ltd. (1974); Nobuhiko Kuroki, "Dyeing Theoretical Chemistry (Sensyoku Riron Kagaku)", Maki Shoten (1966); or Hiroo Inoue, "Methods for Separating Organic Compounds (Yuki Kagobutsu Bunriho)", Shokabo Publishing Co., Ltd. (1990).

The content of the solvent represented by the Formula (1) in the ink composition for ink jet textile printing according to the embodiment is preferably 30 mass % or more from the viewpoint of disperse dye-solubilizing ability. In the ink composition for ink jet textile printing according to the embodiment, the component other than the disperse dye may be the solvent represented by the Formula (1). However, from the viewpoints of obtaining permeability into fabric and appropriate bleeding of ink, the ink composition preferably contains a water-soluble organic solvent and a surfactant, which will be described below, and the content of the solvent represented by the Formula (1) is preferably 30 mass % or more and 90 mass % or less.

The content ratio of the disperse dye to the solvent represented by the Formula (1) [(disperse dye):(solvent represented by the Formula (1))] in the ink composition for ink jet textile printing according to the embodiment is preferably set within a range of 1:24 to 1:72, on mass basis. If the mass of the solvent represented by the Formula (1) is too small, the disperse dye may not be completely solubilized. On the other hand, if the mass of the solvent represented by the Formula (1) is too large, though the disperse dye can be solubilized, the concentration of the disperse dye is low, which may cause a decrease in dyeing ability.

1.3. Other Additives

The ink composition for ink jet textile printing according to the embodiment may contain, for example, a water-soluble organic solvent other than the solvent represented by the Formula (1), a surfactant, a moisturizing agent, and water, as necessary.

The ink composition for ink jet textile printing according to the embodiment may contain a water-soluble organic solvent other than the solvent represented by the Formula (1), from the viewpoint of increasing wettability to fabric to improve permeability of the ink. Examples of the water-soluble organic solvent other than the solvent represented by the Formula (1) include lower alcohols such as ethanol and propanol; cellosolves such as ethylene glycol monomethyl ether and ethylene glycol monoethyl ether; carbitols such as diethylene glycol monomethyl ether and diethylene glycol monoethyl ether; and glycol ethers such as ethylene glycol mono-n-butyl ether, diethylene glycol n-butyl ether, and triethylene glycol n-butyl ether. These water-soluble organic solvents may be used alone or as a mixture of two or more thereof. The content of the water-soluble organic solvent (excluding the solvent represented by the Formula (1)) in the ink composition for ink jet textile printing according to the embodiment is preferably 2 mass % or more and 15 mass % or less.

The ink composition for ink jet textile printing according to the embodiment may contain a surfactant from the viewpoint of increasing wettability to fabric to improve permeability of the ink. Examples of the surfactant include anionic surfactants such as fatty acid salts and alkyl sulfate salts, nonionic surfactants such as acetylene glycol surfactants, cationic surfactants, and amphoteric surfactants. Among them, acetylene glycol surfactants are especially excellent in the function of increasing wettability to fabric and are therefore preferred. Examples of commercial products include Surfynol 61, 82, 104, 440, 465, and 485 and Dynol 604 and 607 (which are trade names, manufactured by Air Products Japan, Inc.). These surfactants may be used alone or as a mixture of two or more thereof. The content of the surfactant in the ink composition for ink jet textile printing according to the embodiment is preferably 0.2 mass % or more and 2 mass % or less.

The ink composition for ink jet textile printing according to the embodiment may contain a moisturizing agent, from the viewpoint of improving discharge stability of the ink from a nozzle of the recording head of an ink jet printer. Examples of the moisturizing agent include polyols such as glycerin, ethylene glycol, diethylene glycol, triethylene glycol, tetraethylene glycol, polyethylene glycol, dipropylene glycol, polypropylene glycol, 1,3-propanediol, 1,4-butanediol, 1,2-hexanediol, 1,5-pentanediol, 1,6-hexanediol, 1,2,6-hexanetriol, and pentaerythriol, and their derivatives such as ethers and esters; lactams such as 2-pyrrolidone, 2-methyl-2-pyrrolidone, and ϵ-caprolactam; ureas such as urea, thiourea, ethyleneurea, and 1,3-dimethylimidazolidinone; and saccharides such as maltitol, sorbitol, gluconolactone, and maltose. These moisturizing agents may be used alone or as a mixture of two or more thereof. The content of the moisturizing agent in the ink composition for ink jet textile printing according to the embodiment is preferably 4 mass % or more and 40 mass % or less.

The ink composition for ink jet textile printing according to the embodiment may further contain water for adjusting physical properties such as viscosity and surface tension of the ink. The water is preferably pure water such as deionized water, ultrafiltration water, reverse osmosis water, or distilled water, or ultrapure water. In particular, water obtained by sterilizing such water by, for example, UV irradiation or addition of hydrogen peroxide can prevent occurrence of molds or bacteria for a long period of time and is therefore preferred.

The ink composition for ink jet textile printing according to the embodiment may further contain various types of additives usually contained in ink compositions for ink jet textile printing, such as an antifungal agent, an antiseptic agent, an antioxidant, an ultraviolet absorber, a chelating agent, an oxygen absorber, a pH adjuster (e.g., triethnolamine), and a dissolving aid, as necessary.

1.4. Physical Properties

The ink composition for ink jet textile printing according to the embodiment preferably has a surface tension at 20° C. of 20 mN/m or more and 50 mN/m or less, more preferably 25 mN/m or more and 40 mN/m or less, from the viewpoint of the balance between printing quality and reliability as an ink composition for ink jet textile printing. Note that the surface tension can be measured with an automatic surface tensiometer, CBVP-Z (manufactured by Kyowa Interface Science Co., Ltd.), by determining the surface tension when a platinum plate is wetted with the ink in an environment of 20° C.

From a similar viewpoint, the viscosity at 20° C. of the ink composition according to the embodiment is preferably 2 mPa·s or more and 15 mPa·s or less, more preferably 2 mPa·s or more and 10 mPa·s or less. Note that the viscosity can be measured with a viscosity analyzer, MCR-300 (manufactured by Pysica), by increasing the shear rate from 10 to 1000 in an environment of 20° C. and reading the viscosity at a shear rate of 200.

The surface tension and the viscosity can be adjusted within the above-mentioned ranges by controlling the concentration of the disperse dye or controlling the type and the amount of the moisturizing agent.

2. Ink Jet Textile Printing Process

The ink jet textile printing process according to the embodiment include the step of discharging the ink composition for ink jet textile printing described above from an ink jet recording head to let the ink composition adhere to fabric. Examples of the fabric as an object to be dyed include woven fabric, knitted fabric, and nonwoven fabric.

In the ink composition for ink jet textile printing according to the embodiment, a disperse dye is stably solubilized in a solvent, as described above. Accordingly, fabric of hydrophobic synthetic fibers such as polyester, nylon, or acetate can be uniformly dyed without causing irregular color by ink jet textile printing using the ink composition for ink jet textile printing according to the embodiment.

Furthermore, according to the ink jet printing process according to the embodiment, a disperse dye is solubilized in a solvent and, therefore, can be readily diffused in synthetic fibers, such as polyester, nylon, or acetate, as an object to be dyed. Accordingly, steaming at high temperature for sufficiently diffusing the disperse dye in the object to be dyed is not necessary, and printing by steaming at lower temperature is possible.

The ink jet recording apparatus that is used for the ink jet textile printing according to the embodiment is not particularly limited, but is preferably a drop-on-demand ink jet recording apparatus. Examples of the drop-on-demand ink jet recording apparatus include those employing a piezoelectric element recording method involving the use of piezoelectric elements disposed in a recording head and those employing a heat jet recording method involving the use of heat energy developed by heaters such as heat-generating resistor elements disposed in a recording head, and any recording method can be used. The ink composition for ink jet textile printing according to the embodiment is used by filling an exclusive cartridge with the ink composition for ink jet textile printing and mounting the exclusive cartridge on an ink jet recording apparatus, as in usual ink.

3. Example

The present invention will be described in detail below with reference to examples, but is not limited to these examples.

3.1. Synthesis of Solvent

3.1.1. Solvent A

N,N-Dimethyl acrylamide (19.828 g) and methanol (6.408 g) were put in a 300-mL separable flask equipped with a stirrer, a thermocouple, and a nitrogen gas inlet tube, and were stirred while nitrogen gas was being introduced. Then, sodium t-butoxide (0.338 g) was added thereto, followed by reaction at 35° C. for 4 hours. After the completion of the reaction, phosphoric acid (150 mg) was added to the reaction mixture to obtain a uniform solution. The solution was left to stand for 3 hours and then filtered to remove precipitate. Furthermore, unreacted matter was removed with an evaporator. Thus, a solvent A represented by the following Formula (3) was obtained:

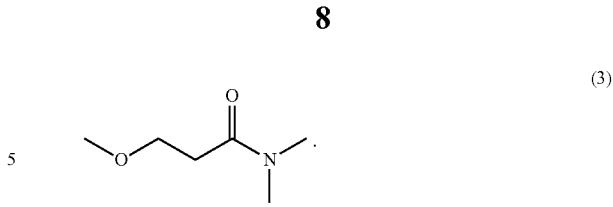

(3)

The HLB value of the obtained solvent A calculated using the Expression (2) from the I/O value based on an organic conception diagram was 18.3.

3.1.2. Solvent B

N,N-Dimethyl acrylamide (19.828 g) and 1-butanol (14.824 g) were put in a 300-mL separable flask equipped with a stirrer, a thermocouple, and a nitrogen gas inlet tube, and were stirred while nitrogen gas was being introduced. Then, sodium t-butoxide (0.338 g) was added thereto, followed by reaction at 35° C. for 4 hours. After the completion of the reaction, phosphoric acid (150 mg) was added to the reaction mixture to obtain a uniform solution. The solution was left to stand for 3 hours and then filtered to remove precipitate. Furthermore, unreacted matter was removed with an evaporator. Thus, a solvent B represented by the following Formula (4) was obtained:

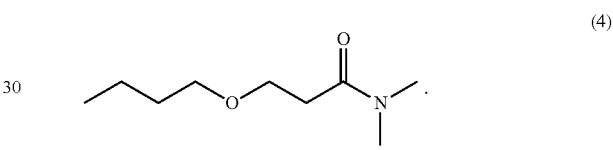

(4)

The HLB value of the obtained solvent B calculated using the Expression (2) from the I/O value based on an organic conception diagram was 12.2.

3.2. Preparation of Ink Composition for Ink Jet Textile Printing

Components of each composition shown in Tables 1 to 3 were mixed and sufficiently stirred, followed by filtration with a membrane filter of 10 μm pore size to prepare each ink composition. The numerical values in the tables are mass %.

The materials shown in the tables are as follows:

Disperse Blue 165 (trade name, manufactured by Nippon Kayaku Co., Ltd., disperse dye), Disperse Yellow 163 (trade name, manufactured by Nippon Kayaku Co., Ltd., disperse dye), Disperse Red 15 (trade name, manufactured by Nippon Kayaku Co., Ltd., disperse dye), Disperse Yellow 114 (trade name, manufactured by Nippon Kayaku Co., Ltd., disperse dye), Disperse Orange 73 (trade name, manufactured by Nippon Kayaku Co., Ltd., disperse dye), Disperse Red 91 (trade name, manufactured by Nippon Kayaku Co., Ltd., disperse dye), Disperse Red 92 (trade name, manufactured by Nippon Kayaku Co., Ltd., disperse dye), Disperse Blue 60 (trade name, manufactured by Nippon Kayaku Co., Ltd., disperse dye), Glycerin (trade name, manufactured by Kao Corp., moisturizing agent), Triethylene glycol (trade name, manufactured by Sankyo Chemical Co., Ltd., moisturizing agent), Triethanolamine (trade name, manufactured by Nippon Shokubai Co., Ltd., pH adjuster), Butyl triglycol (trade name, manufactured by Nippon Nyukazai Co., Ltd., triethylene glycol mono-n-butyl ether, water-soluble organic solvent), Dynol 607 (trade name, manufactured by Air Products Japan, Inc., acetylene glycol surfactant), Ethylene glycol dimethyl ether (trade name, manufactured by Nippon Nyukazai Co., Ltd., water-soluble organic solvent), γ-Butyrolactone (trade name, manufactured by Kanto Chemical Co., Ltd., water-soluble organic solvent), Dimethyl succinate (trade name, manufactured by Kanto Chemical Co., Ltd., water-soluble organic solvent), Solfit AC (trade name, manufactured by Kuraray Co., Ltd., 3-methoxy-3-methyl-1-butyl acetate, water-soluble organic solvent), and 1,3-Dioxolane (trade name, manufactured by Toho Chemical Industry Co., Ltd., water-soluble organic solvent).

3.3. Evaluation Test 3.3.1. Disperse Dye Solubility Test

Each composition (100 g) obtained in "3.2. Preparation of ink composition for ink jet textile printing" was filtered through a PTFE membrane filter of 0.1 μm pore size (manufactured by Millipore Corp., Omnipore membrane filter), and the change in weight of the filter between before and after the filtration was measured.

The obtained ink compositions were each centrifuged with a centrifugal separator at 3500 rpm for 30 minutes, and whether or not a precipitate was present was visually observed. The evaluation criteria are as follows:

A: the change in weight of filter is 1% or less, and no precipitate is observed in the centrifugation test, and B: the change in weight of filter is higher than 1%, or a precipitate is observed in the centrifugation test.

The evaluation results are collectively shown in Tables 1 to 3.

3.3.2. Frequency Response Test

The test was performed using a head mounted on a printer SP-300V, manufactured by Roland DG Corp., by varying the head drive frequency to evaluate flying conditions of discharged ink droplets at each frequency. The "ink droplet shape" and whether or not the discharge was performed without "curved flight" of ink droplets were evaluated, and whether or not these evaluation criteria were guaranteed in continuous discharge (continuous discharge stability) was evaluated. The maximum frequency when all of these evaluation criteria were satisfied was determined. The evaluation results are collectively shown in Tables 1 to 3.

3.3.3. Dyeing Concentration Evaluation Test

An exclusive cartridge of an ink jet printer, PM-750C (manufactured by Seiko Epson Corp.), was filled with any one of the ink compositions shown in Tables 1 to 3, and the exclusive cartridge was set to the PM-750C. Then, printing on pongee (warp and weft were each a wooly yarn with 75 D (denier)) was performed using the ink jet printer PM-750C, and then steaming at 100° C. or 170° C. was performed for 10 minutes. Subsequently, the pongee was washed with an aqueous solution of hydrosulfite/sodium hydroxide (about 0.2% each) at 80° C. Then, Db was measured with Spectrolino (manufactured by GretagMacbeth) to determine the dyeing concentration. The evaluation results are collectively shown in Tables 1 to 3.

TABLE 1

| Material | Example 1 | Example 2 | Example 3 | Example 4 | Example 5 | Example 6 | Example 7 | Example 8 |
| --- | --- | --- | --- | --- | --- | --- | --- | --- |
| Disperse Blue 165 | 0.25 | 0.25 | 0.25 | 0.25 | 0.50 | 0.50 | 1.00 | 1.00 |
| Disperse Yellow 163 | 0.50 | 0.50 | 0.50 | 0.50 | 1.00 | 1.00 | 2.00 | 2.00 |
| Disperse Red 15 | 0.50 | 0.50 | 0.50 | 0.50 | 1.00 | 1.00 | 2.00 | 2.00 |
| Solvent A | 25.00 | | 30.00 | | 60.00 | | 84.00 | |
| Solvent B | | 25.00 | | 30.00 | | 60.00 | | 84.00 |
| Glycerin | 10.00 | 10.00 | 10.00 | 10.00 | 10.00 | 10.00 | | |
| Triethylene glycol | 10.00 | 10.00 | 10.00 | 10.00 | 10.00 | 10.00 | | |
| Triethanolamine | 1.00 | 1.00 | 1.00 | 1.00 | 1.00 | 1.00 | | |
| Butyl triglycol | 10.00 | 10.00 | 10.00 | 10.00 | 10.00 | 10.00 | 10.00 | 10.00 |
| Dynol 607 | 1.00 | 1.00 | 1.00 | 1.00 | 1.00 | 1.00 | 1.00 | 1.00 |
| Water | 41.75 | 41.75 | 36.75 | 36.75 | 5.50 | 5.50 | | |
| Total amount | 100.00 | 100.00 | 100.00 | 100.00 | 100.00 | 100.00 | 100.00 | 100.00 |
| Disperse dye solubility test | B | B | A | A | A | A | A | A |
| Frequency response test (kHz) | 40 | 40 | 40 | 40 | 40 | 40 | 40 | 40 |
| Dyeing conc. (Db) Steaming temp.: 100° C. | 0.5 | 0.5 | 0.7 | 0.7 | 1.0 | 1.0 | 1.2 | 1.2 |
| Dyeing conc. (Db) Steaming temp.: 170° C. | 0.5 | 0.5 | 0.7 | 0.7 | 1.0 | 1.0 | 1.2 | 1.2 |

TABLE 2

| Material | Example 9 | Example 10 | Example 11 | Example 12 | Example 13 | Example 14 | Example 15 | Example 16 |
| --- | --- | --- | --- | --- | --- | --- | --- | --- |
| Disperse Yellow 114 | 5.00 | | | | | | | |
| Disperse Yellow 163 | | 5.00 | | | | | | |
| Disperse Orange 73 | | | 5.00 | | | | | |
| Disperse Red 91 | | | | 5.00 | | | | |
| Disperse Red 92 | | | | | 5.00 | | | |
| Disperse Blue 60 | | | | | | 5.00 | | |
| Disperse Blue 165 | | | | | | | 5.00 | |
| Disperse Red 15 | | | | | | | | 5.00 |
| Solvent A | 84.00 | 84.00 | 84.00 | 84.00 | 84.00 | 84.00 | 84.00 | 84.00 |
| Solvent B | | | | | | | | |
| Glycerin | | | | | | | | |

TABLE 2-continued

| Material | Example 9 | Example 10 | Example 11 | Example 12 | Example 13 | Example 14 | Example 15 | Example 16 |
|---|---|---|---|---|---|---|---|---|
| Triethylene glycol | | | | | | | | |
| Triethanolamine | | | | | | | | |
| Butyl triglycol | 10.00 | 10.00 | 10.00 | 10.00 | 10.00 | 10.00 | 10.00 | 10.00 |
| Dynol 607 | 1.00 | 1.00 | 1.00 | 1.00 | 1.00 | 1.00 | 1.00 | 1.00 |
| Water | | | | | | | | |
| Total amount | 100.00 | 100.00 | 100.00 | 100.00 | 100.00 | 100.00 | 100.00 | 100.00 |
| Disperse dye solubility test | A | A | A | A | A | A | A | A |
| Frequency response test (kHz) | 40 | 40 | 40 | 40 | 40 | 40 | 40 | 40 |
| Dyeing conc. (Db) Steaming temp.: 100° C. | 1.3 | 1.4 | 1.3 | 1.3 | 1.4 | 1.4 | 1.4 | 1.4 |
| Dyeing conc. (Db) Steaming temp.: 170° C. | 1.3 | 1.4 | 1.3 | 1.3 | 1.4 | 1.4 | 1.4 | 1.4 |

TABLE 3

| Material | Comparative Example 1 | Comparative Example 2 | Comparative Example 3 | Comparative Example 4 | Comparative Example 5 |
|---|---|---|---|---|---|
| Disperse Blue 165 | 0.25 | 0.25 | 0.25 | 0.25 | 0.25 |
| Disperse Yellow 163 | 0.50 | 0.50 | 0.50 | 0.50 | 0.50 |
| Disperse Red 15 | 0.50 | 0.50 | 0.50 | 0.50 | 0.50 |
| Ethylene glycol dimethyl ether | 30.00 | | | | |
| γ-Butyrolactone | | 30.00 | | | |
| Dimethyl succinate | | | 30.00 | | |
| 3-Methoxy-3-methyl-1-butyl acetate | | | | 30.00 | |
| 1,3-Dioxolane | | | | | 30.00 |
| Glycerin | 10.00 | 10.00 | 10.00 | 10.00 | 10.00 |
| Triethylene glycol | 10.00 | 10.00 | 10.00 | 10.00 | 10.00 |
| Triethanolamine | 1.00 | 1.00 | 1.00 | 1.00 | 1.00 |
| Butyl triglycol | 10.00 | 10.00 | 10.00 | 10.00 | 10.00 |
| Dynol 607 | 1.00 | 1.00 | 1.00 | 1.00 | 1.00 |
| Water | 36.75 | 36.75 | 36.75 | 36.75 | 36.75 |
| Total amount | 100.00 | 100.00 | 100.00 | 100.00 | 100.00 |
| Disperse dye solubility test | A | A | A | A | A |
| Frequency response test (kHz) | 24 | 28 | 28 | 24 | 28 |
| Dyeing conc. (Db) Steaming temp.: 100° C. | 0.3 | 0.3 | 0.4 | 0.4 | 0.3 |
| Dyeing conc. (Db) Steaming temp.: 170° C. | 0.7 | 0.7 | 0.7 | 0.7 | 0.7 |

3.3.4. Specific Example of Ink Jet Textile Printing Process

An exclusive cartridge of an ink jet printer, PM-750C (manufactured by Seiko Epson Corp.), was filled with the ink composition of Example 3 shown in Table 1, and the exclusive cartridge was set to the PM-750C. Then, printing on pongee (warp and weft were each a wooly yarn of 75 D (denier)) was performed using the ink jet printer PM-750C, and then steaming was performed at 100° C. for 10 minutes. Subsequently, the pongee was washed with an aqueous solution of hydrosulfite/sodium hydroxide (about 0.2% each) at 80° C. for 10 minutes to finish the dyeing. The obtained dyed matter was subjected to "3.3.3. Dyeing concentration evaluation test" to confirm that the dyeing concentration (Db value) was 0.7. Note that the strike-through in the dyed matter obtained in the specific example was high, even though that in usual ink jet textile printing is low. This has revealed that the dyed matter obtained in the specific example also can be effectively applied to, for example, banners.

Furthermore, dyeing was performed as in the above-described specific example except that the ink composition shown below, in which the same amounts of the same disperse dyes were dispersed, was used and that the steaming temperature was varied from 100° C. to 190° C. by each increment of 10° C. As a result, the dyeing concentration (Db value) at a steaming temperature of 100° C. was 0.2, and the dyeing concentration (Db value) at a steaming temperature of 180° C. was 0.7, which was the maximum value. Therefore, it has been revealed that when the ink composition dispersing disperse dyes in the following composition was used, steaming at 180° C. must be performed for 10 minutes in order to obtain appropriately the same dyeing concentration as that in the above-described specific example.

Disperse Dye-Dispersed Ink Composition:
  Disperse Blue 165: 0.25 mass %
  Disperse Yellow 163: 0.50 mass %
  Disperse Red 15: 0.50 mass %
  Dispersant A: 8.00 mass %
  Glycerin: 20.00 mass %
  Sodium dodecylbenzenesulfonate: 0.80 mass %
  Foamban MS-575: 0.05 mass %
  Methyl triglycol: 9.00 mass %, and
  Water: 60.90 mass %.

The dispersant A herein was an aqueous solution of 40% Demol SSL (manufactured by Kao Corp., meta-cresol methylenesulfonic acid/schaeffer's acid formalin condensate salt).

It has been revealed from the results above that in the ink composition solubilizing disperse dyes therein, steaming at a lower temperature is possible compared with the ink composition dispersing the disperse dyes therein.

3.4. Evaluation Results

3.4.1. Disperse Dye Solubility Test

According to Examples 1 and 2, since the content of the solvent A or B with respect to the content of the disperse dyes is too small, the disperse dyes could not be completely solubilized. On the other hand, according to Examples 3 to 16 and Comparative Examples 1 to 5, since the content of the solvent A or B with respect to the content of the disperse dyes was sufficient, the disperse dyes could be completely solubilized.

3.4.2. Frequency Response Test

In Examples 1 to 16, discharge was possible up to a frequency of 40 kHz, whereas discharge was possible only up to 24 to 28 kHz in Comparative Examples 1 to 5. Accordingly, the use of the ink compositions according to Examples allows higher speed driving than the usual ink compositions such as those in Comparative Examples 1 to 5, and, therefore, can contribute to an improvement in productivity.

3.4.3. Dyeing Concentration Evaluation Test (1) In the Case of a Steaming Temperature of 100° C.

In Examples 1 and 2, the disperse dyes could not be completely solubilized, but the dyeing concentration (Db value) obtained by steaming at 100° C. was 0.5. On the other hand, in Comparative Examples 1 to 5, though the disperse dyes could be completely solubilized, the dyeing concentration (Db value) obtained by steaming at 100° C. was 0.3 or 0.4. It is unclear why such a difference in dyeing concentration occurred, but it is conceivable that the difference was caused by the structural characteristics of the solvent A and the solvent B. As described above, in Examples 1 and 2, the resulting Db values were higher than those of Comparative Examples 1 to 5 by performing filtration, even though the concentrations of the disperse dyes were substantially lower than those in Comparative Examples 1 to 5. Accordingly, it is conceivable that at least the solvent A or the solvent B is effective. In addition, in Examples 4 to 16, Db values higher than those in Examples 1 and 2 were obtained by using ink compositions each including the disperse dyes completely solubilized in the solvent A or B.

(2) In the Case of a Steaming Temperature of 170° C.

In Comparative Examples 1 to 5, the dyeing concentrations (Db values) were improved compared with those at the steaming temperature of 100° C., and all of them were 0.7. On the other hand, in Examples 1 to 16, no improvement in the dyeing concentrations (Db values) was observed compared with the cases of a steaming temperature of 100° C. It has been revealed from the above that dyeing concentrations that are the same as or more than those of Comparative Examples 1 to 5 can be acquired by steaming treatment at a lower temperature by using the solvent A or the solvent B as in Examples 1 to 16.

The invention is not limited to the above-described embodiments, and various modifications are possible. For example, the invention includes configurations that are substantially the same as those described in the embodiments (for example, a configuration having the same function, method, and result, or a configuration having the same object and effect). The invention includes configurations in which portions not essential in the configurations described in the embodiments are replaced with other. The invention also includes configurations that achieve the same functions and effects or achieve the same objects of those of the configurations described in the embodiments. In addition, the invention includes configurations in which known techniques are added to the configurations described in the embodiments.

What is claimed is:

1. An ink composition for ink jet textile printing, at least comprising:
    a disperse dye; and
    a solvent represented by the following formula (1)

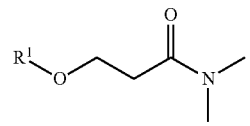

(in Formula (1), $R^1$ denotes an alkyl group having 1 to 4 carbon atoms),
    wherein the solvent represented by Formula (1) has HLB value of 10.5 or more and 20.0 or less, and
    wherein the content of the solvent represented by the Formula (1) is 60 mass% or more and 90 mass% or less.

2. The ink composition for ink jet textile printing according to claim 1, wherein
    $R^1$ in the Formula (1) representing the solvent denotes a methyl group or an n-butyl group.

3. The ink composition for ink jet textile printing according to claim 1, wherein
    the disperse dye is at least one selected from the group consisting of C.I. Disperse Yellow 114, C.I. Disperse Yellow 163, C.I. Disperse Orange 73, C.I. Disperse Red 15, C.I. Disperse Red 91, C.I. Disperse Red 92, C.I. Disperse Blue 60, and C.I. Disperse Blue 165.

4. The ink composition for ink jet textile printing according to claim 1, wherein
    the content of the disperse dye is 0.1 mass % or more and 10 mass % or less.

5. The ink composition for ink jet textile printing according to claim 1, having a viscosity of 2 mPa·s or more and 15 mPa·s or less at a measurement temperature of 20° C.

6. The ink composition for ink jet textile printing according to claim 1, having a surface tension of 20 mN/m or more and 50 mN/m or less at a measurement temperature of 20° C.

7. An ink jet textile printing process, comprising:
    discharging the ink composition for ink jet textile printing according to claim 2 from an ink jet recording head to let the ink composition adhere to fabric.

8. An ink jet textile printing process, comprising: discharging the ink composition for ink jet textile printing according to claim 1 from an ink jet recording head to let the ink composition adhere to fabric.

9. An ink jet textile printing process, comprising:
    discharging the ink composition for ink jet textile printing according to claim 3 from an ink jet recording head to let the ink composition adhere to fabric.

10. An ink jet textile printing process, comprising:
    discharging the ink composition for ink jet textile printing according to claim 4 from an ink jet recording head to let the ink composition adhere to fabric.

11. An ink jet textile printing process, comprising:
    discharging the ink composition for ink jet textile printing according to claim 5 from an ink jet recording head to let the ink composition adhere to fabric.

12. An ink jet textile printing process, comprising:
    discharging the ink composition for ink jet textile printing according to claim 6 from an ink jet recording head to let the ink composition adhere to fabric.

13. The ink composition for ink jet textile printing according to claim 1, wherein the ratio of disperse dye to solvent represented by the formula (1) is in the range of about 1:24 to 1:72.

* * * * *